United States Patent
Grove et al.

(10) Patent No.: US 8,230,271 B2
(45) Date of Patent: *Jul. 24, 2012

(54) DETECTING SOFTWARE RACE CONDITIONS

(75) Inventors: Daniel Dwight Grove, Mercer Island, WA (US); Ivan Posva, Menlo Park, CA (US); Jack H. Choquette, Mountain View, CA (US); Cliff N. Click, Jr., San Jose, CA (US); Jeffrey Gee, Daly City, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,761

(22) Filed: Oct. 22, 2010

(65) Prior Publication Data

US 2011/0041015 A1 Feb. 17, 2011

Related U.S. Application Data

(63) Continuation of application No. 11/716,545, filed on Mar. 8, 2007, now Pat. No. 7,844,862.

(60) Provisional application No. 60/785,798, filed on Mar. 23, 2006.

(51) Int. Cl.
*G06F 11/00* (2006.01)

(52) U.S. Cl. ........ 714/50; 714/47.1; 714/38.11; 711/163
(58) Field of Classification Search .................. None
See application file for complete search history.

(56) References Cited

U.S. PATENT DOCUMENTS

| | | | | |
|---|---|---|---|---|
| 5,535,365 | A | * | 7/1996 | Barriuso et al. ............. 711/155 |
| 5,950,228 | A | * | 9/1999 | Scales et al. ................ 711/148 |
| 6,738,737 | B1 | * | 5/2004 | Carter ........................ 703/17 |
| 7,028,119 | B2 | * | 4/2006 | Hue ........................... 710/200 |
| 7,080,213 | B2 | * | 7/2006 | Grenholm et al. .......... 711/141 |
| 7,254,687 | B1 | * | 8/2007 | Jeter et al. .................. 711/163 |
| 7,356,653 | B2 | * | 4/2008 | von Praun et al. .......... 711/147 |
| 7,366,956 | B2 | * | 4/2008 | Karp et al. ................. 714/38 |
| 7,620,852 | B2 | * | 11/2009 | Rodeheffer et al. ......... 714/42 |
| 7,752,605 | B2 | * | 7/2010 | Qadeer et al. .............. 717/127 |
| 7,861,118 | B2 | * | 12/2010 | Edwards et al. ............ 714/38 |
| 2003/0236951 | A1 | * | 12/2003 | Choi et al. .................. 711/150 |
| 2004/0068613 | A1 | * | 4/2004 | Tierney et al. .............. 711/133 |
| 2004/0117564 | A1 | * | 6/2004 | Grenholm et al. .......... 711/150 |
| 2005/0038806 | A1 | * | 2/2005 | Ma ............................. 707/102 |
| 2007/0150665 | A1 | * | 6/2007 | Arimilli et al. ............. 711/145 |
| 2008/0244332 | A1 | * | 10/2008 | Edwards et al. ............. 714/48 |

* cited by examiner

*Primary Examiner* — Christopher McCarthy
(74) *Attorney, Agent, or Firm* — Van Pelt, Yi & James LLP

(57) ABSTRACT

Detecting a race condition is disclosed. An indication of a store operation to a memory address is received. An identifier of the memory address is stored. The identifier is used to detect an occurrence of a memory operation that is not associated with a previous ordering operation.

78 Claims, 5 Drawing Sheets

DETECTING SOFTWARE RACE CONDITIONS

CROSS REFERENCE TO OTHER APPLICATIONS

This application is a continuation of U.S. patent application Ser. No. 11/716,545, entitled DETECTING SOFTWARE RACE CONDITIONS filed Mar. 8, 2007 which is incorporated herein by reference for all purposes, which is a continuation of U.S. Patent Application No. 60/785,798, entitled DETECTING SOFTWARE RACE CONDITIONS WITHIN A CPU SIMULATOR filed Mar. 23, 2006 which is incorporated herein by reference for all purposes.

BACKGROUND OF THE INVENTION

In a typical computer architecture, parallel processors can enforce strict memory models of in-order execution of stores and loads. However, memory models are becoming weaker as systems with large numbers of memory-coherent processors are becoming common. To prevent a race condition and guarantee that a desired store to memory by one processor in a system is visible to other processors in the system, memory ordering operations such as barrier instructions must be used by a programmer and/or a compiler and/or some other form of code generator. It is easy for programmers and compilers to accidentally omit these memory ordering operations even though a race condition is not desired. This can lead to unpredictable and incorrect program execution. Therefore, there exists a need for a better way to determine whether a desired memory ordering operation has been omitted.

BRIEF DESCRIPTION OF THE DRAWINGS

Various embodiments of the invention are disclosed in the following detailed description and the accompanying drawings.

DETAILED DESCRIPTION

Figure 1:
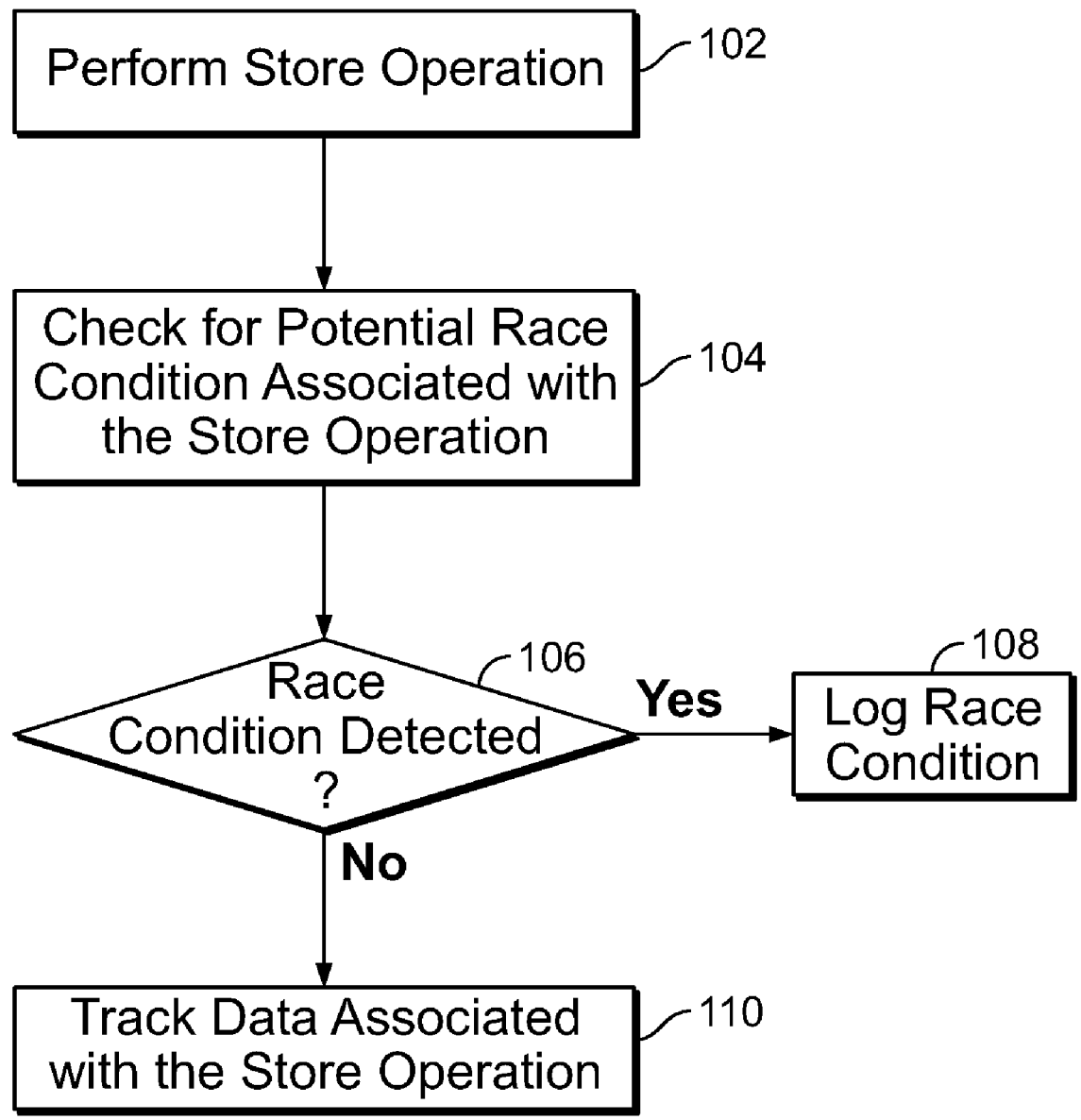
FIG. 1 is a flowchart illustrating an embodiment of performing a store operation.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a memory race condition in a multi-processor environment is disclosed. In some embodiments, at least a portion of the processors are simulated processors. In some embodiments, memory store operations, memory load operations, and/or ordering operations that order memory operations are monitored to detect potential memory race conditions. For example, if a memory location that has been previously stored by a previous store operation is used in a subsequent store and/or load operation without an associated ordering operation, a race condition is detected. In various embodiments, detecting a potential memory race condition includes performing one or more of the following: running the program in a software multi-processor simulator, trapping store and/or load instructions of the program, and replacing store and/or load instructions of the program with other/additional instructions for memory race condition detection. In some embodiments, when a memory store operation of a program is performed, data associated with the store operation is tracked and a check is performed to determine whether the store operation is associated with a potential memory race condition. In some embodiments, when a memory load operation of a program is performed, a check is performed to determine whether the load operation is associated with a potential memory race condition. In some embodiments, when an ordering operation is performed, a race condition detection processing is performed to update/remove tracked information associated with one or more previous store operations. Examples of the ordering operation includes a fence operation, a barrier operation, and a compare and swap operation.

FIG. 1 is a flowchart illustrating an embodiment of performing a store operation. In some embodiments, the process of FIG. 1 is performed when a request for a store operation is received. For example, a processor instruction to store a value to memory is executed and/or compiled. At 102, a store operation is performed. Performing the store operation includes storing a value to a specified memory and/or storage location. In some embodiments, performing the store operation includes performing a simulated store operation using a processor/system simulator. In some embodiments, performing the store operation includes trapping and/or replacing the store operation. At 104, a check is performed to determine whether the store operation is associated with a potential race condition. Checking for the potential race condition includes using information tracked about one or more previous store operations. An example of a detected potential race condition includes detecting a store by a processor to a memory location previously stored to by another processor without performing an associated memory ordering operation. If at 106 it determined a race condition is detected, at 108, the race condition is logged. In some embodiments, logging the race condition includes displaying and/or storing information associated with the detected race condition. For example, a memory location, a processor identifier, and/or a program location/identifier (e.g., a stack location, a program counter, and a function name) is logged to allow a programmer to view, identify, and correct any undesired race conditions. If at 106 it determined a race condition is not detected, at 110, data associated with the store operation is tracked. The tracked data is used in performing a subsequent race condition detection. For example, a memory address, a storage location address, a program location/identifier, and/or a processor identifier are indexed for use in race condition detection.

Figure 2:
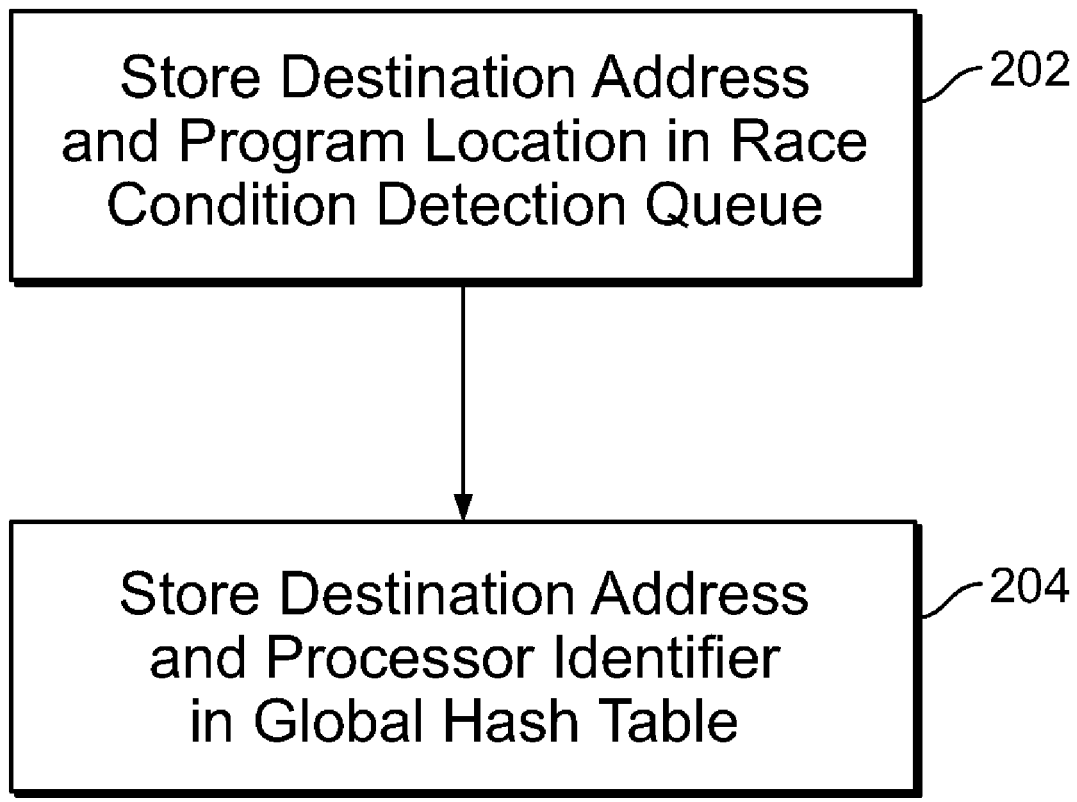
FIG. 2 is a flowchart illustrating an embodiment of a process for tracking information associated with a store operation.

FIG. 2 is a flowchart illustrating an embodiment of a process for tracking information associated with a store operation. In some embodiments, the process of FIG. 2 is included in 110 of FIG. 1. At 202, an identifier of a destination memory address of the store operation and a identifier of a program location associated with the store operation are stored in a race condition detection queue. Storing the program location is optional. A separate race condition detection queue is associated with each processor of a plurality of associated processors, and the memory address identifier and the program location are stored in the respective queue of the processor performing the store operation. In some embodiments, the processors are simulated processors. In some embodiments, the race detection queue is a circular queue and/or fixed in size to allow efficient storage and searching. The queue is merely an example. In various embodiments, a data structure other than a queue is associated with each processor and the data structure can be used to store the identifiers of the destination address and the program location. In some embodiments, the program location includes one or more of the following: a stack location, a stack trace, a program counter, a function name, and any identifier that can be used identify a location within a program. Other data associated with the store operation can be stored in the queue. In some embodiments, storing data in the race condition detection queue is optional. For example, individual data structures associated with each processor is not used and only a global data structure associated with all of the processors is used to track store operations.

At 204, a memory address identifier and a processor identifier are stored in a global hash table. Storing the processor identifier is optional. The global hash table is accessible by a plurality of processors for tracking store operations across the plurality of processors. In some embodiments, the memory address identifier and the processor identifier are associated together in the hash table. The memory address identifier is stored in the hash table together with an associated generation number. Other data associated with the store instruction can be stored in the hash table. In some embodiments, storing data in the global hash table is optional. For example, only data structures privately associated with each processor is used to track store operations. In some embodiments, the hash table is an unlocked hash table that allows fast accesses. For example, without a global data tracking structure, searching each race condition detection queue of every processor to determine whether a previous store operation has stored to a desired memory location can be computationally expensive. Since the unlocked hash table allows fast searching and entry addition, the hash table can be used to determine whether to search race condition detection queues and/or which race condition detection queues to search.

Figure 3:
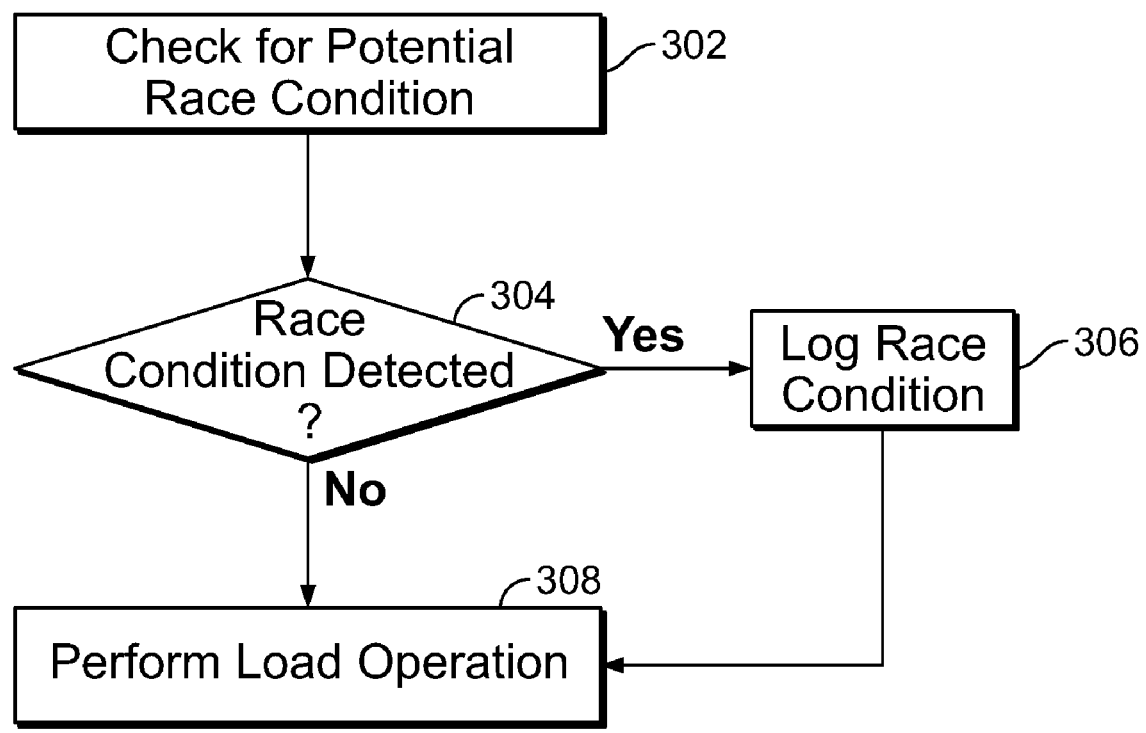
FIG. 3 is a flowchart illustrating an embodiment of a process for performing a load operation.

FIG. 3 is a flowchart illustrating an embodiment of a process for performing a load operation. In some embodiments, the process of FIG. 3 is performed when a request for a load operation is received. At 302, a check is performed to determine whether a potential race condition is associated with the load operation is to be performed. For example, information about previous store operations is searched to determine whether a store operation to the memory address to be loaded has been performed since the last ordering operation by a processor other than the processor performing the load. At 304 if it is determined a race condition has been detected, at 306, the race condition is logged. In some embodiments, logging the race condition includes displaying and/or storing information associated with the detected race condition. For example, a memory location, a processor identifier, and/or a program location is logged to allow a programmer to view, identify, and correct any undesired race conditions. At 306, the load operation is performed. Performing the load operation includes loading a value from memory at a specified memory address. For example, a load processor instruction is performed. In some embodiments, performing the load operation includes performing a simulated load operation. For example, memory is loaded from a simulated memory address of a simulator. In some embodiments, performing the load operation includes trapping and/or replacing the load operation.

Figure 4:
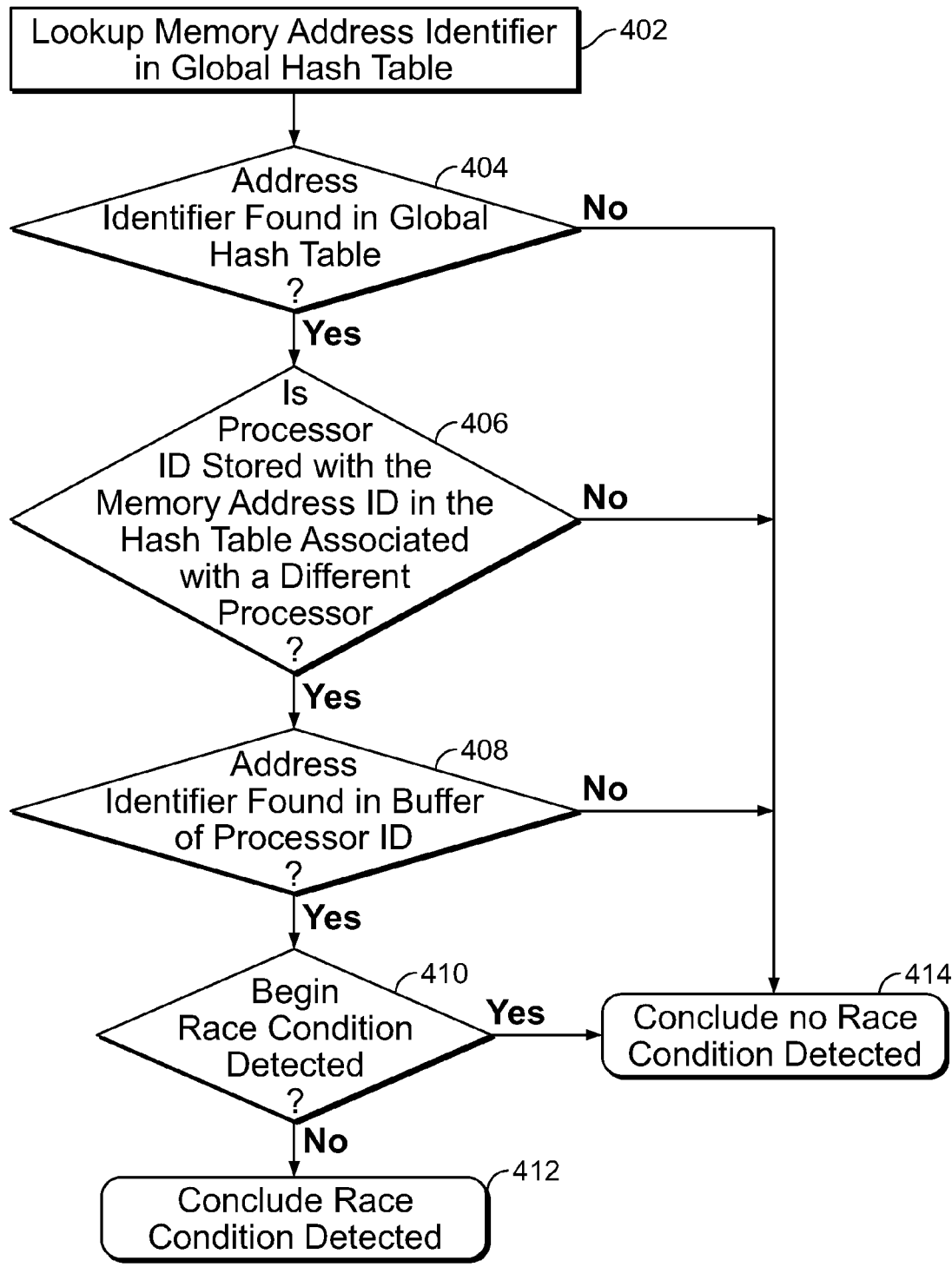
FIG. 4 is a flowchart illustrating an embodiment of a process for detecting a potential race condition.

FIG. 4 is a flowchart illustrating an embodiment of a process for detecting a potential race condition. In some embodiments, the process of FIG. 4 is included in 104 of FIG. 1. In some embodiments, the process of FIG. 4 is included in 302 of FIG. 3. At 402, an identifier of a memory address associated with a memory operation is looked up in a global hash table. Examples of the memory address include a store address of a memory store operation, and a load address of a memory load operation. The global hash table can be accessed by a plurality of associated processors. In some embodiments, the hash table is the hash table of 204 in FIG. 2. At 404, if it is determined that the memory address identifier is not found in the global hash table, at 414 it is concluded that no race condition is detected. In some embodiments, memory address identifiers in the global hash table indicate memory addresses that have been previously been stored to and consequently can be associated with a potential race condition.

If the memory address identifier is found in the global hash table, at 406 it determined whether a processor identifier stored with the memory address identifier in the hash table is associated with a processor that is not the processor performing the memory operation. If the processor identifier is associated with the processor performing the memory operation, at 414 it is concluded that no race condition is detected. Otherwise, at 408 it is determined whether the memory address identifier is found in a race condition detection buffer of a processor identified using the processor identifier. In some embodiments, the race condition detection buffer is the buffer in 204 of FIG. 2. Finding the memory address identifier in the buffer includes searching entries of the buffer for the memory address identifier. If the memory address identifier is not found, at 414 it is concluded that no race condition is detected. Otherwise, at 410 it is determined whether the memory operation using the memory address is associated with a benign race condition. In some embodiments, one or more predetermined criteria for a benign race condition is specified for one or more program applications. For example, a memory address that is always associated with benign race condition is specified for a program. If a benign race condition is detected, at 414 it is concluded that no race condition is detected. Otherwise, at 412 it concluded a race condition is detected.

In the example of the FIG. 4, both a global hash table and a race detection queue of a processor have been used in determining whether a race condition is detected. In some embodiments, using the race condition detection queue is optional. For example, only the global hash table is searched to determine whether a race condition is detected. In some embodiments, using the global hash table is optional. For example, rather than searching the global hash table, individual race condition detection queues are searched to determine whether a race condition is detected.

Figure 5:
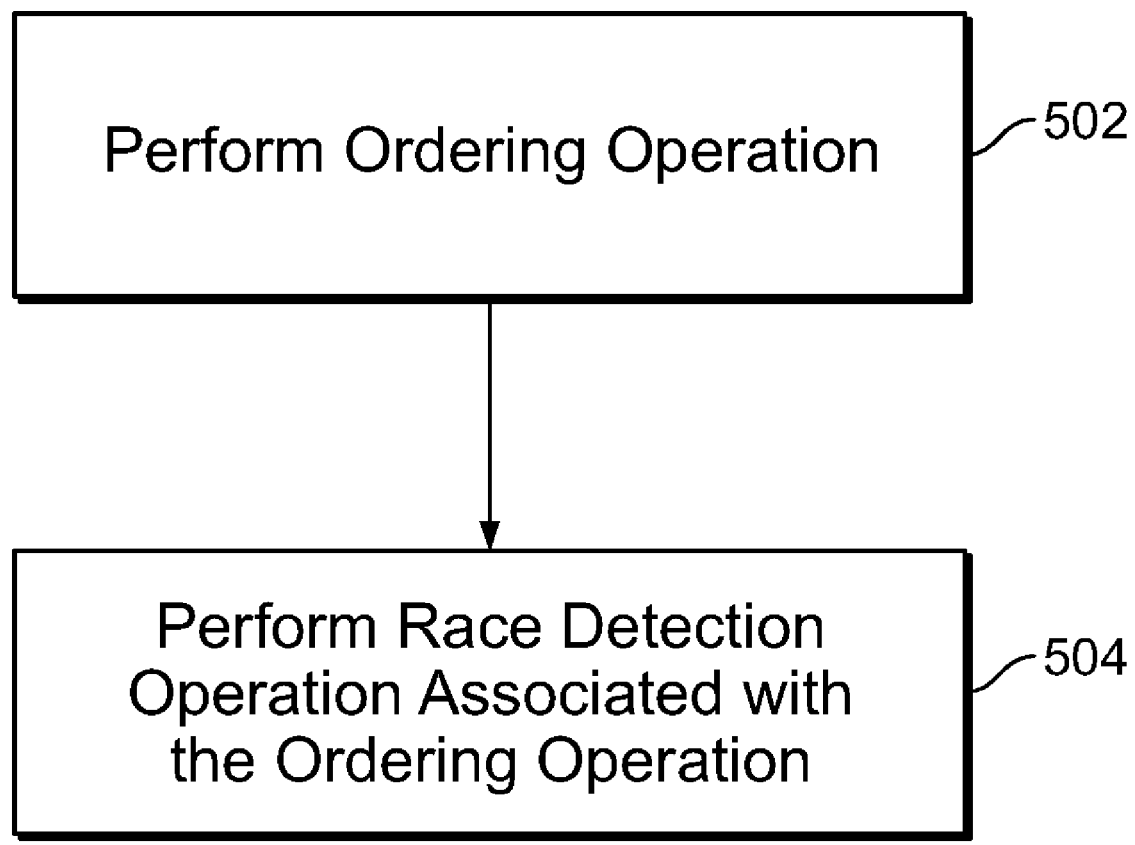
FIG. 5 is flowchart illustrating an embodiment of a process for performing an ordering operation.

FIG. 5 is flowchart illustrating an embodiment of a process for performing an ordering operation. In some embodiments, the process of FIG. 5 is performed when a request for an ordering operation is received. At 502, an operation ordering memory operations is performed. The ordering operation orders memory operations such that one or more store operations occurring before the ordering operation is visible to other processors before any memory operation occurring after the ordering operation. For example, a store fence operation is performed. In some embodiments, performing the ordering operation includes performing a simulated ordering operation in a simulator. In some embodiments, performing the ordering operation includes trapping and/or replacing the ordering operation. At 504, a race condition detection operation associated with the ordering operation is performed. Tracking data that tracks memory addresses modified by a processor is reset and/or updated to reflect the memory ordering operation. For example, entries in a race condition detection buffer of the processor are removed and/or entries in a global hash table associated with the processor are removed. In some embodiments, the buffer is the buffer in 202 of FIG. 2 and the hash table is the hash table in 204 of FIG. 2. In some embodiments, hash table entries are never removed/modified. For example, since removing entries in the hash table can be computationally expensive, entries are not removed, and consequently the hash table includes data that is not potentially relevant to race condition detection. The hash table is used to approximate whether appropriate race detection queues should be searched. In some embodiments, the global hash table is not used and only the race condition detection queues are used.

In some embodiments, performing the race detection operation includes modifying (e.g., incrementing) a reference generation identifier that can be used to determine whether a memory operation has been performed after an ordering operation. For example, identifiers of store operation destination memory addresses are stored in a global hash table together with associated generation numbers. When a store and/or load operation is performed, the hash table can be searched to locate entries associated with a desired memory address and a desired generation number to determine whether the memory operation is likely associated with a race condition. By using the generation identifier, the need for a race condition detection queue associated with each processor can be eliminated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting a race condition, comprising:
    receiving an indication of a store operation to a memory address to store a data;
    storing an identifier of the memory address associated with the store operation, wherein the identifier indentifies the memory address where the data is stored; and
    using the identifier to detect an occurrence of a memory operation that is not associated with a previous ordering operation.

2. A method as recited in claim 1, wherein the memory operation includes one or more of the following: a store operation to the memory address, and a load operation from the memory address.

3. A method as recited in claim 1, wherein using the identifier to detect the memory operation occurrence includes determining that an ordering operation has been omitted.

4. A method as recited in claim 1, wherein using the identifier to detect the memory operation occurrence includes performing one or more of the following: trapping the memory operation, replacing the memory operation, and running the memory operation in a simulator.

5. A method as recited in claim 1, wherein the ordering operation includes one or more of the following: a fence operation, a barrier operation, and a compare and swap operation.

6. A method as recited in claim 1, wherein using the identifier to detect the memory operation occurrence includes displaying or logging information of the memory operation.

7. A method as recited in claim 6, wherein the information of the memory operation includes one or more of the following: the memory address, an identifier of a processor performing the memory operation, and an identifier of a location within a program.

8. A method as recited in claim 1, wherein detecting the memory operation occurrence allows a user to view, identify, or correct an undesired race condition caused by the memory operation.

9. A method as recited in claim 1, further comprising associating and storing with the identifier of the memory address one or more of the following: an identifier of a processor associated with the memory operation, a program counter, an identifier of a location within a program, a stack location, a stack trace, and a function name.

10. A method as recited in claim 1, wherein using the identifier to detect the memory operation occurrence includes determining that the memory operation occurrence is associated with a different processor from a processor associated with the store operation.

11. A method as recited in claim 1, wherein the identifier of the memory address includes at least a portion of the memory address.

12. A method as recited in claim 1, wherein the store operation is associated with a first processor, and the using the identifier to detect the memory operation occurrence includes determining whether a store operation of a second processor has stored to the memory address after a latest ordering operation has been performed.

13. A method as recited in claim 1, wherein the store operation is associated with a first processor, and the using the identifier to detect the memory operation occurrence includes determining whether a load operation of a second processor has loaded from the memory address after a latest ordering operation has been performed.

14. A method as recited in claim 1, wherein storing the identifier of the memory address includes storing the identifier in a data structure associated with a single processor.

15. A method as recited in claim 14, wherein the identifier of the memory address is stored in a data structure associated with a plurality of processors.

16. A method as recited in claim 1, wherein storing the identifier of the memory address includes storing the identifier in a data structure associated with a plurality of processors.

17. A method as recited in claim 16, wherein the data structure includes an unlocked hash table.

18. A method as recited in claim 16, wherein the identifier of the memory address is stored with a generation identifier that can be used to determine whether the memory operation is performed after the ordering operation.

19. A method as recited in claim 1, wherein using the identifier to detect the memory operation occurrence includes using the identifier of the memory address to search a global data structure associated with a plurality of processors.

20. A method as recited in claim 19, wherein a search result of the global data structure indicates a memory address that is potentially associated with a race condition.

21. A method as recited in claim 19, wherein a search result of the global data structure can be used to identify a private data structure associated with at least one processor, and detecting the memory operation includes using the identifier of the memory address to search the private data structure.

22. A method as recited in claim 1, wherein using the identifier to detect the memory operation occurrence includes using one or more predetermined criteria to determine the memory operation is not associated with a benign race condition.

23. A method as recited in claim 1, wherein the ordering operation orders memory operations such that a store operation, if any, of a processor occurring before the ordering operation is visible to other processors before any memory operation occurring after the ordering operation.

24. A method as recited in claim 1, wherein performing the ordering operation includes removing the stored identifier of the memory address.

25. A method as recited in claim 1, wherein the performing the ordering operation includes updating a generation reference identifier that can be used to determine whether the memory operation is performed after the ordering operation.

26. A method as recited in claim 1, wherein the identifier of the memory address is stored in a global data tracking structure accessible by a plurality of processors for tracking store operations across the plurality of processors and using the identifier to detect an occurrence of a memory operation that is not associated with a previous ordering operation includes accessing the global data tracking structure.

27. A system for detecting a race condition, comprising:
a processor; and
a memory coupled with the processor, wherein the memory is configured to provide the processor with instructions which when executed cause the processor to:
receive an indication of a store operation to a memory address to store a data,
store an identifier of the memory address associated with the store operation, wherein the identifier identifies the memory address where the data is stored, and
use the identifier to detect an occurrence of a memory operation that is not associated with a previous ordering operation.

28. A system as recited in claim 27, wherein the memory operation includes one or more of the following: a store operation to the memory address, and a load operation from the memory address.

29. A system as recited in claim 27, wherein using the identifier to detect the memory operation occurrence includes determining that an ordering operation has been omitted.

30. A system as recited in claim 27, wherein using the identifier to detect the memory operation occurrence includes performing one or more of the following: trapping the memory operation, replacing the memory operation, and running the memory operation in a simulator.

31. A system as recited in claim 27, wherein the ordering operation includes one or more of the following: a fence operation, a barrier operation, and a compare and swap operation.

32. A system as recited in claim 27, wherein using the identifier to detect the memory operation occurrence includes displaying or logging information of the memory operation.

33. A system as recited in claim 32, wherein the information of the memory operation includes one or more of the following: the memory address, an identifier of a processor performing the memory operation, and an identifier of a location within a program.

34. A system as recited in claim 27, wherein detecting the memory operation occurrence allows a user to view, identify, or correct an undesired race condition caused by the memory operation.

35. A system as received in claim 27, wherein the memory is further configured to provide the processor with instructions which when executed cause the processor to associate and store with the identifier of the memory address one or more of the following: an identifier of a processor associated with the memory operation, a program counter, an identifier of a location within a program, a stack location, a stack trace, and a function name.

36. A system as recited in claim 27, wherein using the identifier to detect the memory operation occurrence includes determining that the memory operation occurrence is associated with a different processor from a processor associated with the store operation.

37. A system as recited in claim 27, wherein the identifier of the memory address includes at least a portion of the memory address.

38. A system as recited in claim 27, wherein the store operation is associated with a first processor, and the using the identifier to detect the memory operation occurrence includes determining whether a store operation of a second processor has stored to the memory address after a latest ordering operation has been performed.

39. A system as recited in claim 27, wherein the store operation is associated with a first processor, and the using the identifier to detect the memory operation occurrence includes determining whether a load operation of a second processor has loaded from the memory address after a latest ordering operation has been performed.

40. A system as recited in claim 27, wherein storing the identifier of the memory address includes storing the identifier in a data structure associated with a single processor.

41. A system as recited in claim 40, wherein the identifier of the memory address is stored in a data structure associated with a plurality of processors.

42. A system as recited in claim 27, wherein storing the identifier of the memory address includes storing the identifier in a data structure associated with a plurality of processors.

43. A system as recited in claim 42, wherein the data structure includes an unlocked hash table.

44. A system as recited in claim 42, wherein the identifier of the memory address is stored with a generation identifier that can be used to determine whether the memory operation is performed after the ordering operation.

45. A system as recited in claim 27, wherein using the identifier to detect the memory operation occurrence includes using the identifier of the memory address to search a global data structure associated with a plurality of processors.

46. A system as recited in claim 45, wherein a search result of the global data structure indicates a memory address that is potentially associated with a race condition.

47. A system as recited in claim 45, wherein a search result of the global data structure can be used to identify a private data structure associated with at least one processor, and detecting the memory operation includes using the identifier of the memory address to search the private data structure.

48. A system as recited in claim 27, wherein using the identifier to detect the memory operation occurrence includes using one or more predetermined criteria to determine the memory operation is not associated with a benign race condition.

49. A system as recited in claim 27, wherein the ordering operation orders memory operations such that a store operation, if any, of a processor occurring before the ordering operation is visible to other processors before any memory operation occurring after the ordering operation.

50. A system as recited in claim 27, wherein performing the ordering operation includes removing the stored identifier of the memory address.

51. A system as recited in claim 27, wherein the performing the ordering operation includes updating a generation reference identifier that can be used to determine whether the memory operation is performed after the ordering operation.

52. A system as recited in claim 27, wherein the identifier of the memory address is stored in a global data tracking structure accessible by a plurality of processors for tracking store operations across the plurality of processors and using the identifier to detect an occurrence of a memory operation that is not associated with a previous ordering operation includes accessing the global data tracking structure.

53. A computer program product for detecting a race condition, the computer program product being embodied in a non-transitory, computer readable medium and comprising computer instructions for:
receiving an indication of a store operation to a memory address to store a data;
storing an identifier of the memory address associated with the store operation, wherein the identifier identifies the memory address where the data is stored; and using the identifier to detect an occurrence of a memory operation that is not associated with a previous ordering operation.

54. A computer program product as recited in claim 53, wherein the memory operation includes one or more of the following: a store operation to the memory address, and a load operation from the memory address.

55. A computer program product as recited in claim 53, wherein using the identifier to detect the memory operation occurrence includes determining that an ordering operation has been omitted.

56. A computer program product as recited in claim 53, wherein using the identifier to detect the memory operation occurrence includes performing one or more of the following: trapping the memory operation, replacing the memory operation, and running the memory operation in a simulator.

57. A computer program product as recited in claim 53, wherein the ordering operation includes one or more of the following: a fence operation, a barrier operation, and a compare and swap operation.

58. A computer program product as recited in claim 53, wherein using the identifier to detect the memory operation occurrence includes displaying or logging information of the memory operation.

59. A computer program product as recited in claim 58, wherein the information of the memory operation includes one or more of the following: the memory address, an identifier of a processor performing the memory operation, and an identifier of a location within a program.

60. A computer program product as recited in claim 53, wherein detecting the memory operation occurrence allows a user to view, identify, or correct an undesired race condition caused by the memory operation.

61. A computer program product as recited in claim 53, further comprising associating and storing with the identifier of the memory address one or more of the following: an identifier of a processor associated with the memory operation, a program counter, an identifier of a location within a program, a stack location, a stack trace, and a function name.

62. A computer program product as recited in claim 53, wherein using the identifier to detect the memory operation occurrence includes determining that the memory operation occurrence is associated with a different processor from a processor associated with the store operation.

63. A computer program product as recited in claim 53, wherein the identifier of the memory address includes at least a portion of the memory address.

64. A computer program product as recited in claim 53, wherein the store operation is associated with a first processor, and the using the identifier to detect the memory operation occurrence includes determining whether a store operation of a second processor has stored to the memory address after a latest ordering operation has been performed.

65. A computer program product as recited in claim 53, wherein the store operation is associated with a first processor, and the using the identifier to detect the memory operation occurrence includes determining whether a load operation of a second processor has loaded from the memory address after a latest ordering operation has been performed.

66. A computer program product as recited in claim 53, wherein storing the identifier of the memory address includes storing the identifier in a data structure associated with a single processor.

67. A computer program product as recited in claim 66, wherein the identifier of the memory address is stored in a data structure associated with a plurality of processors.

68. A computer program product as recited in claim 53, wherein storing the identifier of the memory address includes storing the identifier in a data structure associated with a plurality of processors.

69. A computer program product as recited in claim 68, wherein the data structure includes an unlocked hash table.

70. A computer program product as recited in claim 68, wherein the identifier of the memory address is stored with a generation identifier that can be used to determine whether the memory operation is performed after the ordering operation.

71. A computer program product as recited in claim 53, wherein using the identifier to detect the memory operation occurrence includes using the identifier of the memory address to search a global data structure associated with a plurality of processors.

72. A computer program product as recited in claim 71, wherein a search result of the global data structure indicates a memory address that is potentially associated with a race condition.

73. A computer program product as recited in claim 71, wherein a search result of the global data structure can be used to identify a private data structure associated with at least one processor, and detecting the memory operation includes using the identifier of the memory address to search the private data structure.

74. A computer program product as recited in claim 53, wherein using the identifier to detect the memory operation occurrence includes using one or more predetermined criteria to determine the memory operation is not associated with a benign race condition.

75. A computer program product as recited in claim 53, wherein the ordering operation orders memory operations such that a store operation, if any, of a processor occurring before the ordering operation is visible to other processors before any memory operation occurring after the ordering operation.

76. A computer program product as recited in claim 53, wherein performing the ordering operation includes removing the stored identifier of the memory address.

77. A computer program product as recited in claim 53, wherein the performing the ordering operation includes updating a generation reference identifier that can be used to determine whether the memory operation is performed after the ordering operation.

78. A computer program product as recited in claim 53, wherein the identifier of the memory address is stored in a global data tracking structure accessible by a plurality of processors for tracking store operations across the plurality of processors and using the identifier to detect an occurrence of a memory operation that is not associated with a previous ordering operation includes accessing the global data tracking structure.

* * * * *

UNITED STATES PATENT AND TRADEMARK OFFICE
CERTIFICATE OF CORRECTION

PATENT NO. : 8,230,271 B2  
APPLICATION NO. : 12/910761  
DATED : July 24, 2012  
INVENTOR(S) : Grove et al.

Page 1 of 1

It is certified that error appears in the above-identified patent and that said Letters Patent is hereby corrected as shown below:

In The Claims

In column 8, line 17, claim 35 after "system as" delete "received" and insert --recited-- therefor.

Signed and Sealed this
Twelfth Day of July, 2016

Michelle K. Lee
*Director of the United States Patent and Trademark Office*